(12) United States Patent
Tsai et al.

(10) Patent No.: US 12,211,212 B2
(45) Date of Patent: Jan. 28, 2025

(54) IMAGE SEGMENTATION METHOD AND ELECTRONIC DEVICE AND STORAGE MEDIUM USING THE METHOD THEREOF

(71) Applicant: NATIONAL CHENG KUNG UNIVERSITY, Tainan (TW)

(72) Inventors: Yi-Shan Tsai, Tainan (TW); Cheng-Shih Lai, Tainan (TW); Chao-Yun Chen, Tainan (TW); Meng-Jhen Wu, Tainan (TW); Yun-Chiao Wu, Tainan (TW); Hsin-Yi Feng, Taichung (TW); Po-Tsun Kuo, Taipei (TW); Kai-Yi Wang, Taichung (TW); Wei-Cheng Su, New Taipei (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 504 days.

(21) Appl. No.: 17/560,305

(22) Filed: Dec. 23, 2021

(65) Prior Publication Data

US 2023/0021110 A1    Jan. 19, 2023

(30) Foreign Application Priority Data

Jul. 13, 2021    (TW) ................. 110125658

(51) Int. Cl.
*G06T 7/13* (2017.01)
*G06N 20/00* (2019.01)
*G06T 5/00* (2024.01)
*G06T 5/70* (2024.01)
*G06T 7/00* (2017.01)
*G06T 7/12* (2017.01)

(52) U.S. Cl.
CPC ............... *G06T 7/13* (2017.01); *G06N 20/00* (2019.01); *G06T 5/70* (2024.01); *G06T 7/0012* (2013.01); *G06T 7/12* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

2010/0278425 A1* 11/2010 Takemoto ............... G06T 7/10
                                                      382/173
2022/0215201 A1*  7/2022 Dwivedi ................ G06N 3/045

FOREIGN PATENT DOCUMENTS

TW    202001797 A    1/2020
TW    202040585 A    11/2020

* cited by examiner

*Primary Examiner* — Andrew H Lam (57) ABSTRACT

An image segmentation method includes the following steps: obtaining a target image; inputting the target image into a machine learning model to obtain an image segmentation parameter value corresponding to the target image; executing an image segmentation algorithm on the target image according to the image segmentation parameter value to obtain an image segmentation result, wherein the image segmentation result is segmenting the target image into object regions; and displaying the image segmentation result. In addition, an electronic device and storage medium using the method are also provided.

24 Claims, 6 Drawing Sheets

IMAGE SEGMENTATION METHOD AND ELECTRONIC DEVICE AND STORAGE MEDIUM USING THE METHOD THEREOF

CROSS-REFERENCE TO RELATED APPLICATION

This non-provisional application claims priority under 35 U.S.C. § 119(a) on Patent Application No. 110125658 filed in Taiwan, R.O.C. on Jul. 13, 2021, the entire contents of which are hereby incorporated by reference.

BACKGROUND OF THE INVENTION

1. Field of the Invention

The present disclosure relates to an image segmentation method, and in particular to an image segmentation method based on machine learning.

2. Description of the Related Art

In recent years, computer computation and storage capacity is on the rise, and electronic apparatuses are increasingly popular. High-speed computation and copious data together facilitate the development of technology about the Internet of Things and artificial intelligence (AI). Practical issues in every field are nowadays handled by AI to save manpower and perform precise analyses.

Diagnostic images are generated by modern medical imaging technologies, such as X-ray imaging, computed tomography, magnetic resonance imaging, nuclear medicine, and biopsies, to enable medical professionals to make accurate diagnoses. Therefore, some image analysis technologies are applied to the reading and analyses of medical images.

However, the reading of medical images has a direct effect on the medical behaviors and decisions of a medical team. Therefore, it is important to enhance the accuracy in the reading of medical images.

BRIEF SUMMARY OF THE INVENTION

An objective of the present disclosure is to provide an image segmentation method, an electronic device using the method, and a storage medium using the method, so as to perform image segmentation on different target images with different image segmentation parameters, thereby enhancing precision.

In an embodiment of the present disclosure, the electronic device comprises a display unit, storage element and processor. The display unit displays images. The storage element stores a plurality of modules. The processor is coupled to the display unit and storage element to access and execute the plurality of modules stored in the storage element. The plurality of modules stored in the storage element includes an image retrieval module, parameter calculation module, image segmentation module and image display module. The image retrieval module is for obtaining a target image. The parameter calculation module inputs the target image into a machine learning model to obtain an image segmentation parameter value corresponding to the target image. The image segmentation module executes an image segmentation algorithm on the target image with the image segmentation parameter value to obtain an image segmentation result. The image segmentation result is about segmenting the target image into object regions. The image display module displays the image segmentation results on the display unit.

In an embodiment of the present disclosure, the image segmentation method comprises the steps of: obtaining a target image; inputting the target image into a machine learning model to obtain an image segmentation parameter value corresponding to the target image; executing an image segmentation algorithm on the target image with the image segmentation parameter value to obtain an image segmentation result, wherein the image segmentation result is segmenting the target image into object regions; and displaying the image segmentation result.

In an embodiment of the present disclosure, the machine-readable storage medium, adapted to store therein programs, the program being loaded to a computer and executed thereon to carry out an image segmentation method, the image segmentation method comprising the steps of: obtaining a target image; inputting the target image into a machine learning model to obtain an image segmentation parameter value corresponding to the target image; executing an image segmentation algorithm on the target image with the image segmentation parameter value to obtain an image segmentation result, wherein the image segmentation result is segmenting the target image into object regions; and displaying the image segmentation result.

DETAILED DESCRIPTION OF THE INVENTION

To facilitate understanding of the object, characteristics and effects of this present disclosure, embodiments together with the attached drawings for the detailed description of the present disclosure are provided.

Some of the embodiments of the present disclosure are hereunder depicted with accompanying drawings and described below. Regarding reference numerals used hereunder, when identical reference numerals are shown in different accompanying drawings, the reference numerals shall be deemed denoting identical or similar components. These embodiments are merely parts of the present disclosure but do not disclose all feasible embodiments of the present disclosure. To be precise, these embodiments merely define the scope of a method and device disclosed in the claims of the present disclosure.

The embodiments described hereunder are about performing image segmentation on medical images. The medical images are segmented into object regions for subsequent use by users. To be precise, the embodiments described hereunder are exemplified by computed tomography (CT) images. In this regard, a computed tomography image shows a patient's internal organs, including the liver, kidneys, gallbladder, pancreas, spleen and the like. Furthermore, the computed tomography image may also show a lesion. As disclosed in the embodiments of the present disclosure, an image segmentation method is provided and adapted to segment a computed tomography image into image regions illustrative of the liver, kidneys, gallbladder, pancreas, spleen and the like as well as lesions, in order to assist a medical team in making medical diagnoses, but the present disclosure is not limited thereto. In practice, the image segmentation method of the present disclosure also applies to any other related imaging fields.

Figure 1:
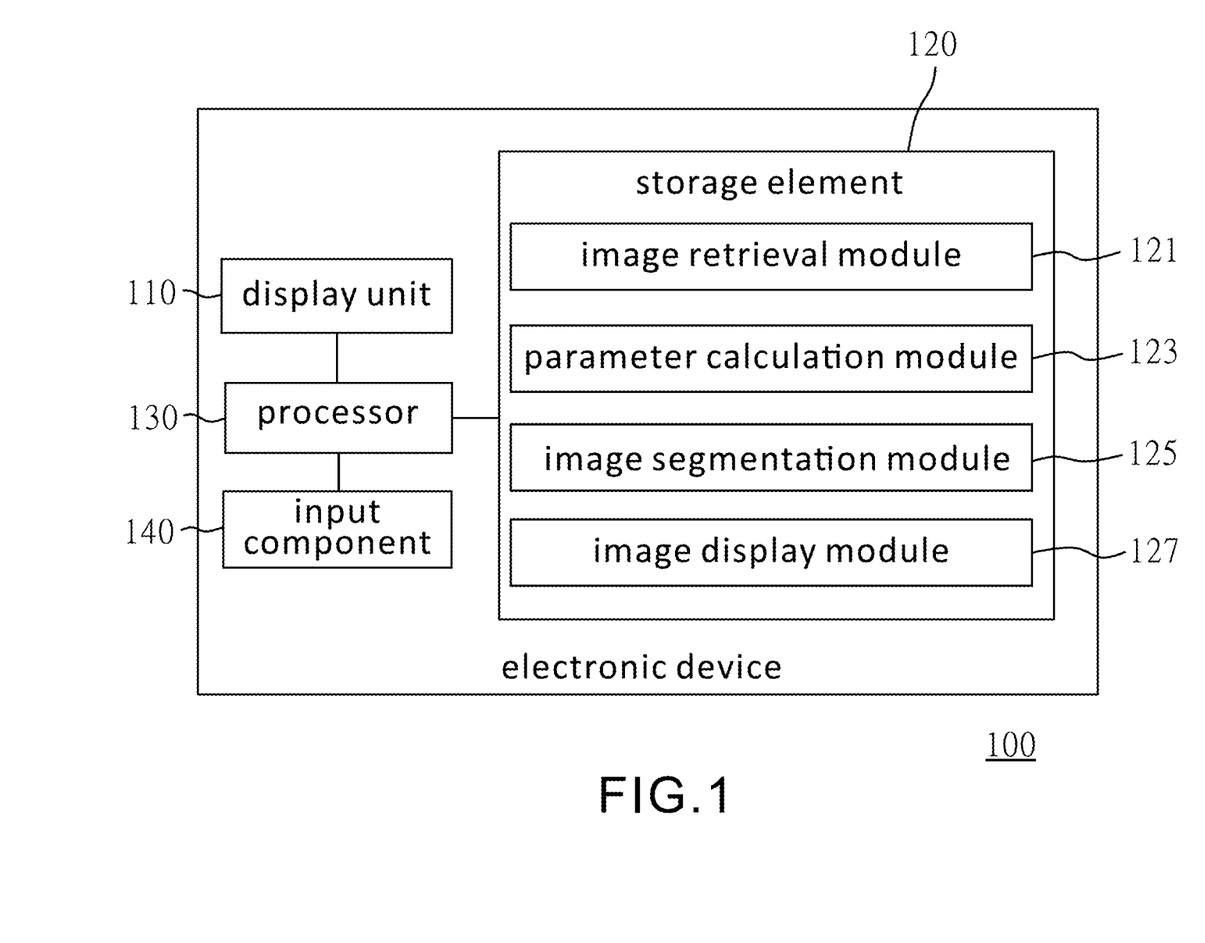
FIG. 1 is a block diagram of an electronic device in an embodiment of the present disclosure.

FIG. 1 is a block diagram of an electronic device in an embodiment of the present disclosure.

Referring to FIG. 1, in this embodiment, an electronic device 100 comprises a display unit 110, storage element 120 and processor 130. The processor 130 is coupled to display unit 110 and storage element 120. The electronic device 100 is capable of performing image computation and is, for example, a personal computer, notebook computer, smartphone, tablet or personal digital assistant (PDA), but is not limited thereto.

The display unit 110 displays images which users watch. In this embodiment, the display unit 110 is, for example, a liquid crystal display (LCD), light-emitting diode (LED) or field emission display (FED), but the present disclosure is not limited thereto.

The storage element 120 is, for example, fixed or movable, is random access memory (RAM), read-only memory (ROM), Flash memory, hard disk drive, the like, or a combination thereof, and is adapted to store files and data. In this embodiment, the storage element 120 records a plurality of modules executed by the processor 130. The plurality of modules includes an image retrieval module 121, parameter calculation module 123, image segmentation module 125 and image display module 127. In some embodiments, the plurality of modules further includes an edge detection module and an edge correction module. In some embodiments, the plurality of modules further includes a model training module, but the present disclosure is not limited thereto.

The processor 130 is, for example, a central processing unit (CPU), microprocessor which is programmable to serve general or special purposes, digital signal processor (DSP), programmable controller, Application Specific Integrated Circuits (ASIC), programmable logic device (PLD), the like or a combination thereof. In this embodiment, the processor 130 is coupled to the display unit 110 and storage element 120 to access the plurality of modules in the storage element 120 and thereby execute the functionality of image segmentation, whereas the display unit 110 displays an image segmentation result for users to watch.

In some embodiments, the electronic device 100 further comprises an input component 140. The input component 140 enables users to operate the electronic device 100 and receives signals generated as a result of the users' operating the electronic device 100. The input component 140 is a keyboard, mouse, stylus, touch panel or trackball, which is externally connected to or built-in in the electronic device 100 and is coupled to the processor 130. In some embodiments, the input component 140 is integrated into the display unit 110 to form a touchscreen, such as a capacitive or resistive touchscreen for receiving users' touch-based inputs.

Figure 2:
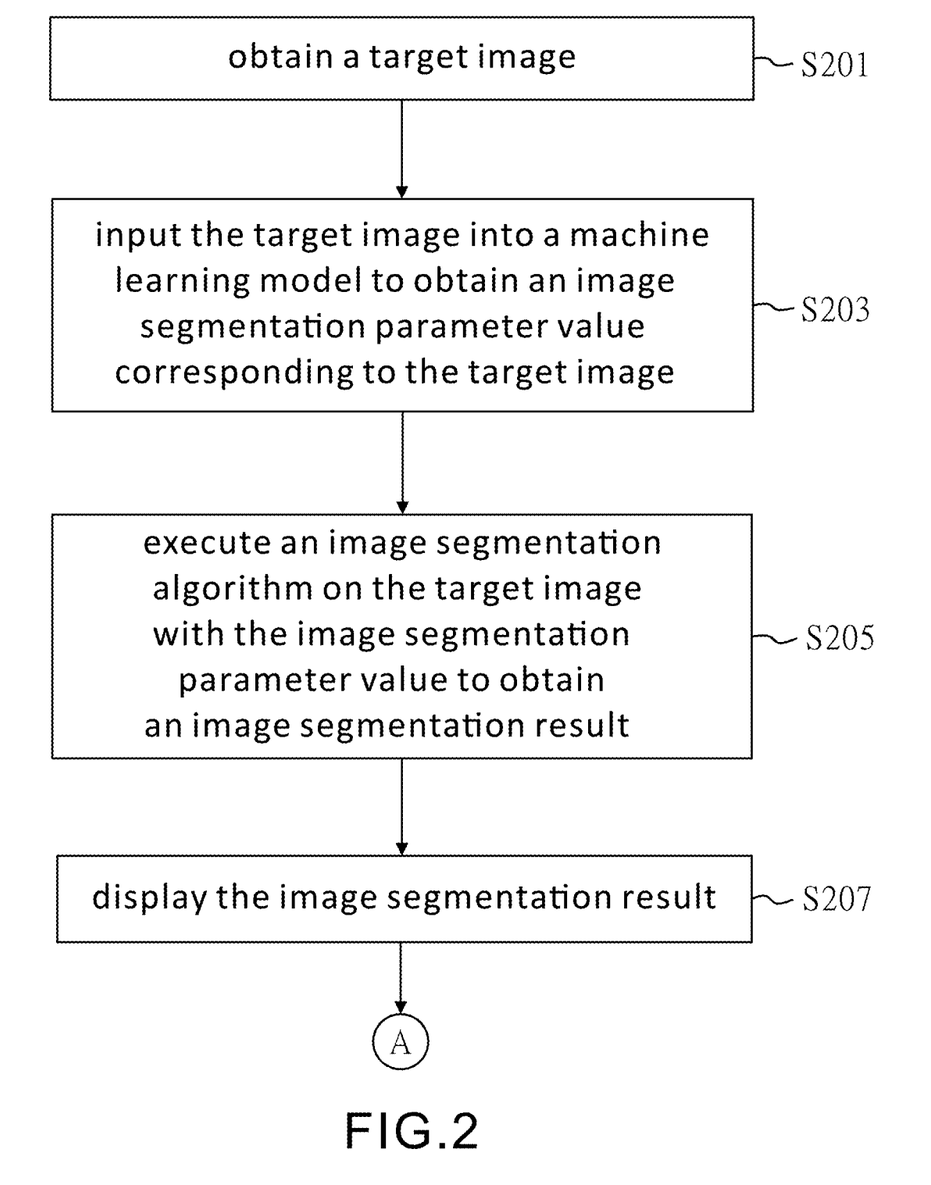
FIG. 2 is a schematic view of the process flow of an image segmentation method in an embodiment of the present disclosure.
Figure 3:
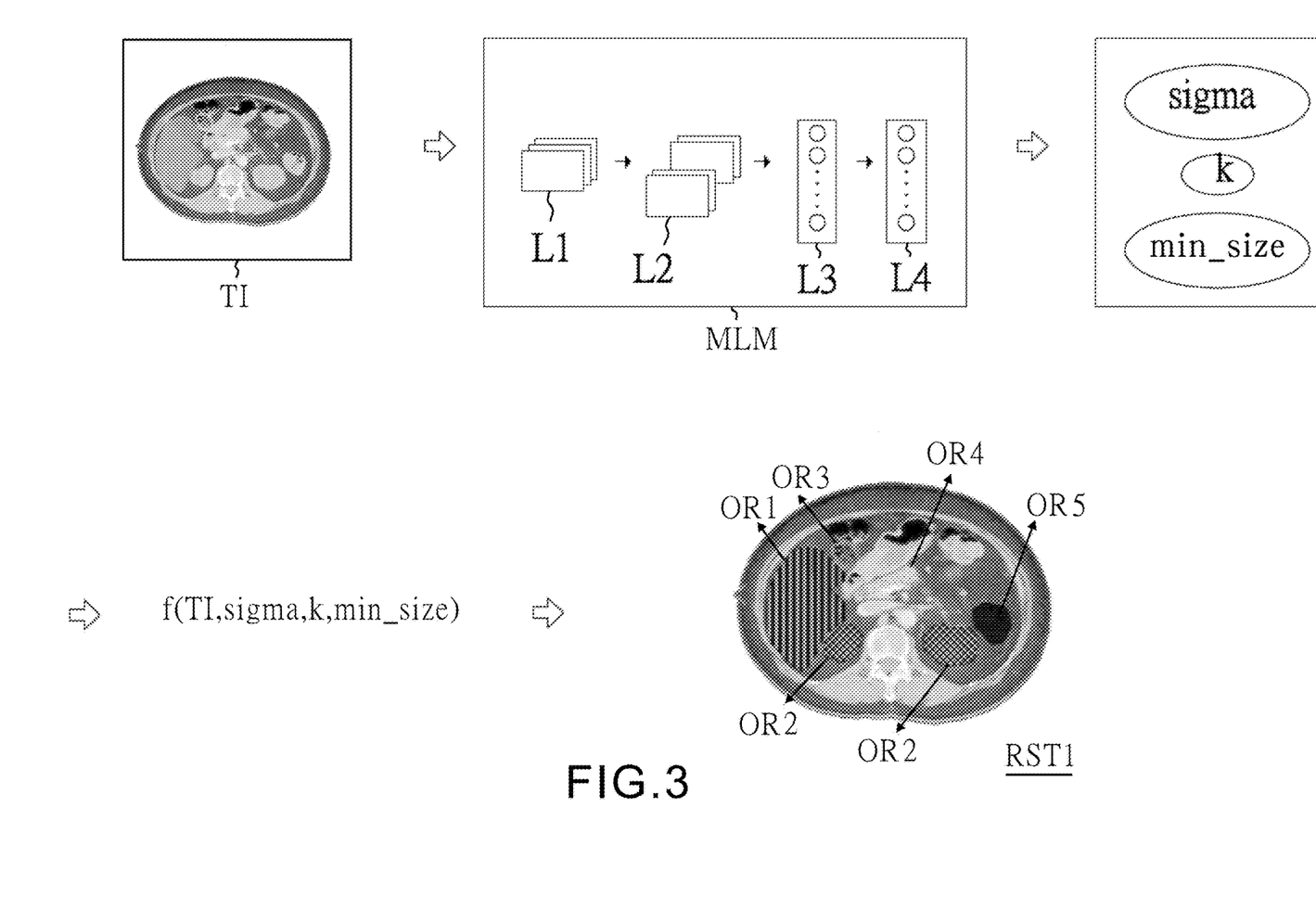
FIG. 3 is a schematic view of the image segmentation method in an embodiment of the present disclosure.

FIG. 2 is a schematic view of the process flow of an image segmentation method in an embodiment of the present disclosure. FIG. 3 is a schematic view of the image segmentation method in an embodiment of the present disclosure. The method in this embodiment is applicable to the electronic device 100 of FIG. 1. The steps of the image segmentation method of the present disclosure are hereunder described with reference to the constituent elements of the electronic device 100.

Referring to FIG. 2 and FIG. 3, in step S201, the image retrieval module 121 of the electronic device 100 captures target image TI.

The image segmentation method is aimed at target image TI.

In this embodiment, target image TI is, for example, the computed tomography image shown in FIG. 3, but the present disclosure is not limited thereto. In some embodiments, target image TI is, for example, stored in the storage element 120 beforehand, whereas target image TI stored in the storage element 120 is loaded to the image retrieval module 121. However, the present disclosure is not limited thereto. The image retrieval module 121 also retrieves the path of target image TI.

In this embodiment, the processor 130 executes an image segmentation algorithm on target image TI to segment it into object regions. The image segmentation algorithm is, for example, a foreground segmentation algorithm in a computer vision field and is adapted to carry out a series of operations, such as pre-processing, recognition, sorting and the like, to images. Therefore, during its execution, the image segmentation algorithm requires an image segmentation parameter which the precision of image segmentation results depends on. For example, the image segmentation algorithm is a Graph Based Segmentation Algorithm in OpenCV, whereas the image segmentation parameter comprises an image smoothening parameter (for example, Gaussian Blur parameter sigma), threshold function parameter k and the least component magnitude min_size.

In step S203, the parameter calculation module 123 of the electronic device 100 inputs a machine learning model MLM according to target image TI to obtain an image segmentation parameter value corresponding to target image TI through the machine learning model MLM.

The precision of image segmentation results depends on the image segmentation parameter values. Therefore, if the machine learning model MLM is used to output different image segmentation parameter values corresponding to different target images TI, respectively, each target image TI can have precise image segmentation results. Therefore, if different target images TI use identical image segmentation parameter values, the precision of the image segmentation results varies. In some embodiments, the parameter calculation module 123, for example, converts each target image TI into data of specific forms or formats and then inputs the machine learning model MLM. In some embodiments, the parameter calculation module 123 directly inputs target image TI to the machine learning model MLM.

In this embodiment, the target image TI and training data for use in training the machine learning model MLM are, for example, the medical images which fall within the same field, whereas the parameter calculation module 123, for example, inputs target image TI to the machine learning model MLM, and the machine learning model MLM outputs an image segmentation parameter value (for example, Gaussian Blur parameter value, threshold function parameter value and the least component magnitude) corresponding to target image TI. For example, when the parameter calculation module 123 inputs the first target image to the machine learning model MLM, the machine learning model MLM outputs the first image segmentation parameter value corresponding to the first target image. The parameter calculation module 123 inputs the second target image, which is different from the first target image, to the machine learning model MLM. The machine learning model MLM outputs the second image segmentation parameter value corresponding to the second target image. The first image segmentation parameter and the second image segmentation parameter are of the same type, for example, both comprise Gaussian Blur parameter sigma, threshold function parameter k and the least component magnitude min_size; however, the second image segmentation parameter value is different from the first image segmentation parameter value.

In this embodiment, the machine learning model MLM is, for example, a four-layered neural network (NN) shown in FIG. 3. The first layer L1 is a convolution layer with a kernel size of 5*5, a stride of 1, an input channel number of 3, and an output channel number of 6. The second layer L2 is a convolution layer with a kernel size of 5*5, a stride of 1, an input channel number of 6, and an output channel number of 18. The third layer L3 is a fully-connected layer, with the number of output neurons of 1024. The fourth layer L4 is a fully-connected layer, with the number of output neurons of the same number (for example, 3) as the image segmentation parameters. However, the present disclosure is not limited thereto. In another embodiment, the machine learning model MLM is constructed in another way. Furthermore, details and training data of the machine learning model MLM are hereunder illustrated with an embodiment and described below.

As disclosed in some papers about machine learning, the input layer and output layer are integrated into a machine learning model to function as the first layer and last layer of the machine learning model, respectively. For illustrative sake, this embodiment does not use the aforesaid descriptive language but discloses making the input layer and output layer independent of the machine learning model MLM. However, persons skilled in the art understand that, in this embodiment, the input layer inputs data corresponding to target image TI, and the output layer comprises an image segmentation parameter value. This embodiment remains unaffected, whether the input layer and output layer are integrated into the machine learning model or not.

Computation of the image segmentation parameter value corresponding to target image TI is followed by step S205. In step S205, the image segmentation module 125 of the electronic device 100 executes an image segmentation algorithm on target image TI with the image segmentation parameter value to obtain an image segmentation result RST1. Next, in step S207, the image display module 127 of the electronic device 100 displays the image segmentation result RST1 on the display unit 110.

The image segmentation module 125 executes an image segmentation algorithm on target image TI with the image segmentation parameter value corresponding to target image TI obtained by the machine learning module MLM to generate the image segmentation result RST1. The image segmentation result RST1 segments target image TI into object regions. The image display module 127 displays the image segmentation result RST1 on the display unit 110 for users to watch.

In this embodiment, the image segmentation module 125, for example, executes an OpenCV-based image segmentation algorithm (expressed by the function f(TI, sigma, k, min_size) in FIG. 3) on target image TI with Gaussian Blur parameter value, threshold function parameter value and the least component magnitude value corresponding to target image TI obtained by the machine learning model MLM and obtains the image segmentation result RST1 shown in FIG. 3, including object regions, such as liver OR1, kidneys OR2, gallbladder OR3, pancreas OR4, and spleen OR5. Finally, the image display module 127 displays the image segmentation result RST1 on the display unit 110. For example, in the image segmentation result RST1 displayed, the object regions, namely liver OR1, kidneys OR2, gallbladder OR3, pancreas OR4, and spleen OR5, are marked so as to be watched by users.

In some embodiments, the electronic device 100 comprises the input component 140 whereby users perform interactive operations on the image segmentation result RST1.

In some embodiments, users may regard the object regions in the image segmentation result RST1 as overly fragmented. Thus, to address this issue, users can use the input component 140 to send a regional merger signal for instructing object regions to merge. After receiving the regional merger signal from the input component 140, the processor 130, for example, uses the "merger" function in OpenCV to merge the object regions specified by the regional merger signal into one object region and displays the merger result on the display unit 110, but the present disclosure is not limited thereto.

In some embodiments, users may want object regions of interest to be eye-catching. To this end, users can use the input component 140 to send a selection signal for selecting at least one of object regions. After receiving the selection signal from the input component 140, the processor 130, for example, instructs the display unit 110 to display and mark the object regions selected by users and not to mark any unselected object regions.

In some embodiments, after the image segmentation module 125 has received the image segmentation result RST1, the processor 130 further adjusts the image segmentation result RST1, for example, by fine-tuning the edge of at least one object region in the image segmentation result RST1, so as to obtain a more precise result.

Figure 4:
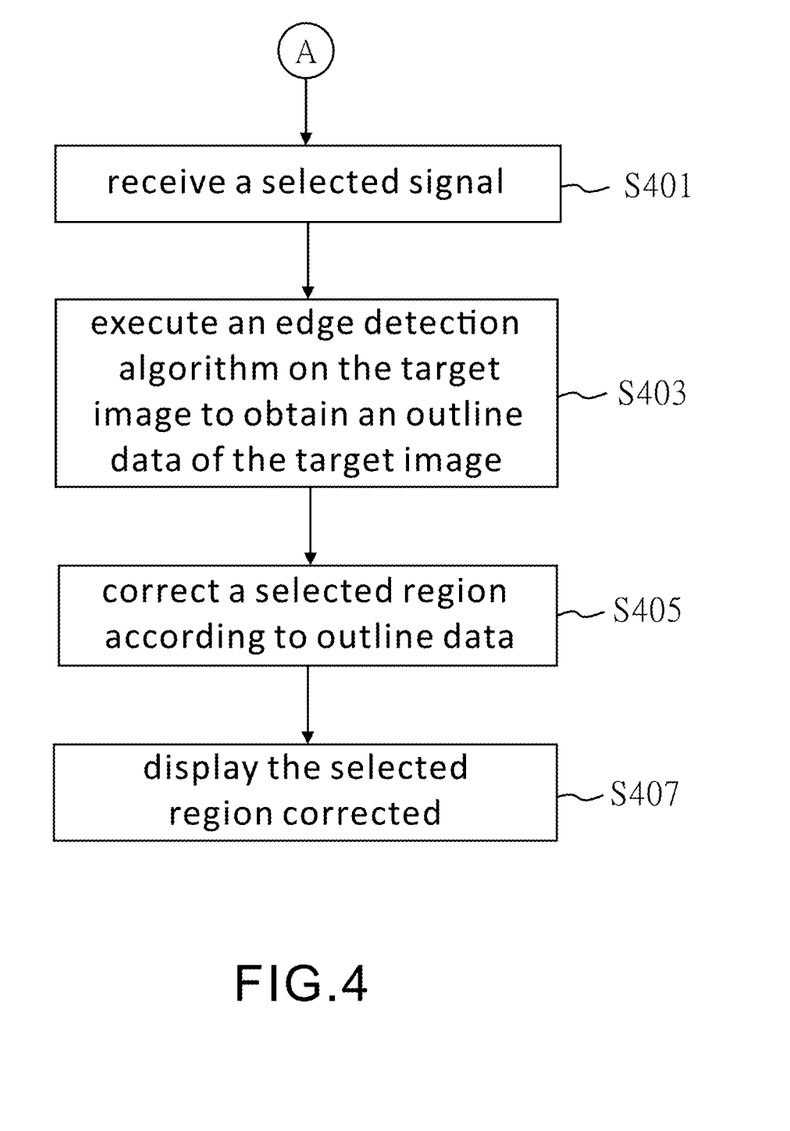
FIG. 4 is a schematic view of the process flow of the image segmentation method in an embodiment of the present disclosure.

FIG. 4 is a schematic view of the process flow of the image segmentation method in an embodiment of the present disclosure. The method in this embodiment applies to the electronic device 100 of FIG. 1. The steps of the image segmentation method of the present disclosure are hereunder described with reference to the constituent elements of the electronic device 100.

Referring to FIG. 2, FIG. 3 and FIG. 4, the display unit 110 displays the image segmentation result RST1 in step S207 and then proceeds to step S401. In step S401, the input component 140 receives a selection signal.

The users use the input component 140 to send the selection signal and select at least one selected region from object regions in the image segmentation result RST1. Therefore, the selection signal corresponds to at least one object region selected by users. In this embodiment, users, for example use the input component 140 to send a selection signal in order to select two object regions, namely liver OR1 and kidneys OR2, to serve as selected regions.

In step S403, an edge detection module (not shown) of the electronic device 100 executes an edge detection algorithm on target image TI to obtain outline data of target image TI.

The edge detection algorithm identifies an outline or edge in target image TI. The present disclosure is not restrictive of the steps of the edge detection algorithm. Persons skilled in the art are capable of executing the edge detection algorithm as needed to obtain the outline data. In addition, the outline data is descriptive of an edge or outline in target image TI and comprises outline pixels of target image TI, i.e., the pixels where the edge or outline in target image TI is, but the present disclosure is not limited thereto.

In this embodiment, the edge detection module performs pre-processing on target image TI. For example, if target image TI is a colored computed tomography image, the edge detection module will, for example, in the course of pre-processing performs color conversion, such as colored format to grayscale format, on target image TI and then performs an image smoothening operation, such as Gaussian Blur. However, the present disclosure is not limited thereto. Persons skilled in the art are capable of performing the pre-processing of target image TI as needed.

In this embodiment, upon completion of the pre-processing process, the edge detection module computes an object outline in target image TI to obtain the outline data. For example, the edge detection module performs computation on the pre-processed target image TI with Sobel operator to compute the brightness gradient of adjacent pixel points of the outline in target image TI. Persons skilled in the art can refer to related papers to understand how to compute the brightness gradient of adjacent pixel points of the outline with Sobel operator.

In this embodiment, the edge detection module further computes the outline pixels in target image TI precisely according to the brightness gradient of adjacent pixel points of the outline. The greater the brightness gradient of the pixels is, the more likely the pixels are the outline pixels. Therefore, the edge detection module compares the brightness gradient with a gradient threshold in order to determine the outline pixels. In this embodiment, the edge detection module determines the gradient threshold by Otsu's method and then compares the brightness gradient of adjacent pixel points of the outline with the determined gradient threshold to obtain the outline pixels of target image TI. Unlike setting the gradient threshold to a constant, Otsu's method can determine gradient thresholds corresponding to different target images, respectively, so as to further enhance precision. However, the present disclosure is not limited thereto. Persons skilled in the art are capable of computing the outline data of target image TI as needed.

After the outline data of target image TI has been obtained, in step S405, an edge correction module (not shown) of the electronic device 100 corrects the selected regions according to the outline data.

The edge correction module identifies all the edge pixels of each selected region and then searches the outline data for outline pixels which are more suitable for use as the edges of the selected regions in order to replace the edge pixels with the outline pixels.

Figure 5:
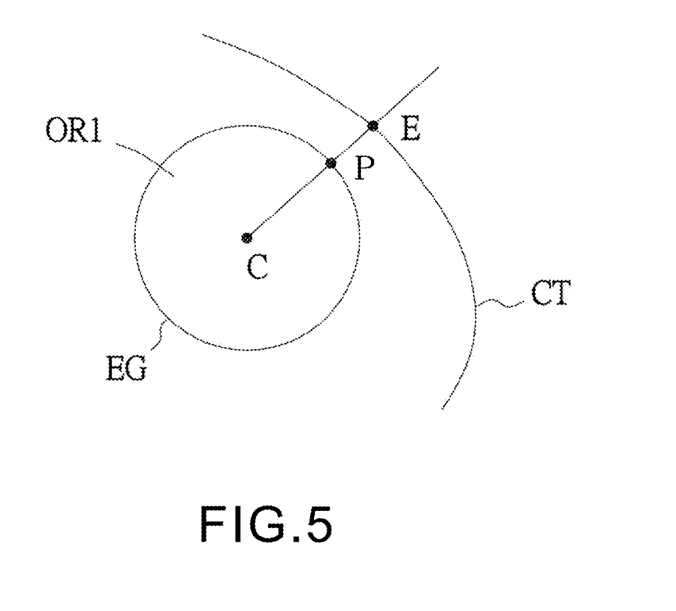
FIG. 5 is a schematic view of edge correction in an embodiment of the present disclosure.

FIG. 5 is a schematic view of edge correction in an embodiment of the present disclosure.

Referring to FIG. 5, in this embodiment, selected region OR1 comprises edge pixels EG which surround selected region OR1, whereas the outline data comprises outline pixels CT. The edge pixels EG of selected region OR1 include edge pixels P. The edge pixels P of this embodiment are described below. Thus, details of the other edge pixels of the other selected regions and selected region OR1 can be deduced by analogy.

The edge correction module computes a regional center C of selected region OR1. In this embodiment, the regional center C is, for example, a geometrical center of all the edge pixels EG of selected region OR1, but the present disclosure is not limited thereto. In another embodiment, the regional center C is computed according to the other information (for example, the color or grayscale value of each pixel) of selected region OR1.

The edge correction module determines whether available pixels exist within a predetermined range of the edge pixels P in the direction of a line connecting the regional center C and the edge pixels P. When outline pixels exist within the predetermined range of the edge pixels P, the outline pixels nearest to the edge pixels P are the available pixels corresponding to the edge pixels P. Conversely, when no outline pixels exist within the predetermined range of the edge pixels P, the edge pixels P do not correspond to any available pixels.

In this embodiment, the predetermined range is, for example, 10 pixels. Accordingly, the edge correction module determines whether available pixels exist within 10 pixels of the edge pixels P in the direction of a line connecting the regional center C and the edge pixels P. In this embodiment, in the direction of a line connecting the regional center C and the edge pixels P, the outline pixels nearest to the edge pixels P are outline pixels E. Therefore, if the distance between the outline pixel E and the edge pixel P is greater than 10 pixels, the edge pixel P does not have any available pixels. Conversely, if the distance between the outline pixel E and the edge pixel P is not greater than 10 pixels, the outline pixel E is an available pixel corresponding to the edge pixel P; meanwhile, the edge correction module replaces the edge pixel P with the outline pixel E, such that the outline pixel E serves as the edge pixel of selected region OR1.

Referring to FIG. 4, after the edge correction module has corrected the edges of all selected regions according to outline data, in step S407, the image display module 127 of the electronic device 100 displays the edge-corrected selected regions on the display unit 110.

As soon as the display unit 110 displays image segmentation result RST1, users use the input component 140 to select at least one selected region in object regions, such that the electronic device 100 further corrects the edges of the selected region. Then, the display unit 110 displays those selected regions with marked corrected edges.

Figure 6:
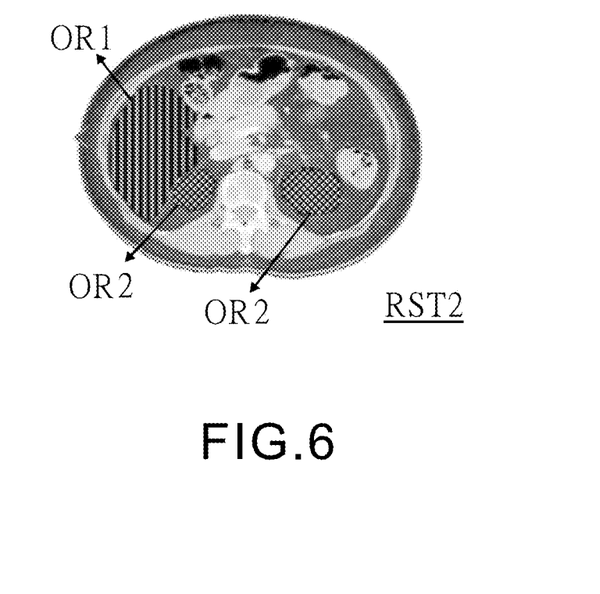
FIG. 6 is a schematic view of an image segmentation result of selected regions in an embodiment of the present disclosure.

FIG. 6 is a schematic view of an image segmentation result of selected regions in an embodiment of the present disclosure.

In this embodiment, users use the input component 140 to select two object regions (i.e., selected regions), namely liver OR1 and kidneys OR2, according to the image segmentation result RST1 displayed on the display unit 110. Referring to FIG. 6, after correcting the edges of the two selected regions, namely liver OR1 and kidneys OR2, the processor 130 marks the two corrected selected regions, namely liver OR1 and kidneys OR2, and displays them in image segmentation result RST2.

Referring to FIG. 3 and FIG. 6 in this embodiment, when image segmentation result RST1 is displayed, the object regions, namely liver OR1, kidneys OR2, gallbladder OR3, pancreas OR4, and spleen OR5, are marked in order to be watched by users. After users have used the input component 140 to select two selected regions, namely liver OR1 and kidneys OR2, image segmentation result RST2 marks only the two selected regions selected by users, namely liver OR1 and kidneys OR2. In this embodiment, before image segmentation result RST2 is displayed, the processor 130 performs correction of the edges of the selected regions.

In this embodiment, the electronic device 100 uses the result of edge detection to correct the object regions selected by users. However, the present disclosure is not limited thereto. In another embodiment, the result of edge detection can be used to correct all the object regions in image segmentation result RST1. Persons skilled in the art can accomplish this embodiment.

Figure 7:
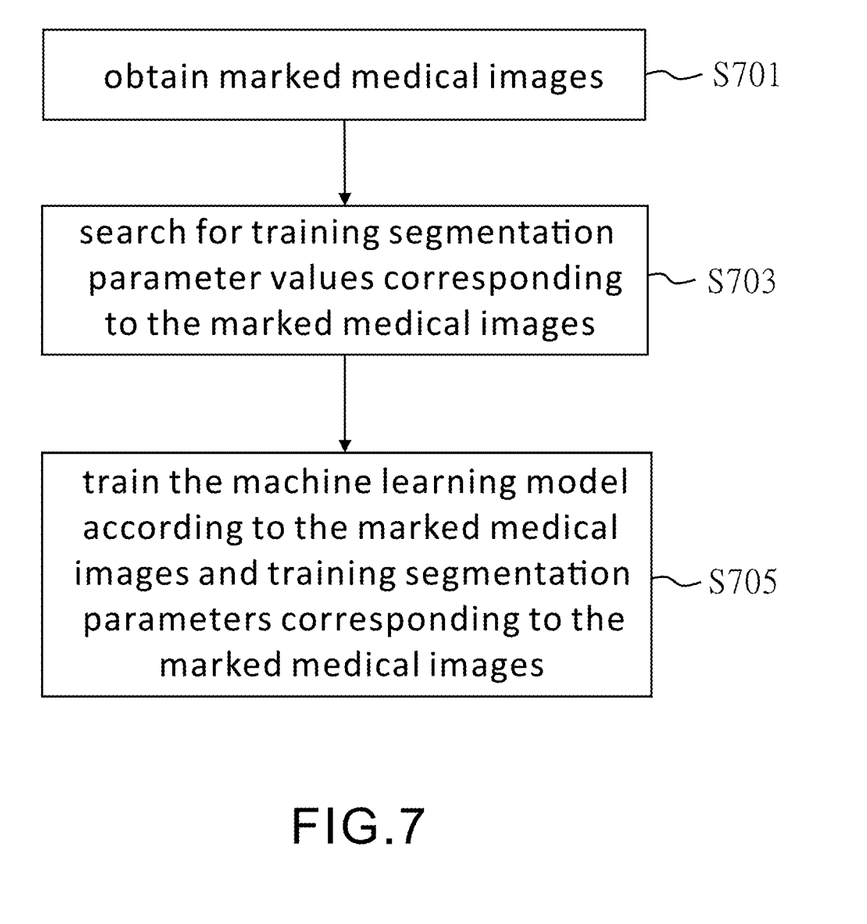
FIG. 7 is a schematic view of the process flow of training a machine learning model in an embodiment of the present disclosure.

FIG. 7 is a schematic view of the process flow of training a machine learning model in an embodiment of the present disclosure.

A training method for the machine learning model MLM used in the image segmentation method in this embodiment is described below, but the present disclosure is not limited thereto. Persons skilled in the art can train the machine learning model MLM as needed.

The computed tomography image described in the preceding embodiment is regarded as the target image TI described in this embodiment, but the present disclosure is not limited thereto. In another embodiment, target image TI is of any other type.

Referring to FIG. 7, in step S701, a model training module (not shown) of the electronic device 100 obtains marked medical images.

The model training module obtains marked images of the same type as target image TI. For example, if target image TI is a specific type of medical image (for example, a computed tomography scan image of the entire human body), the model training module will obtain the same type of marked medical images (for example, a marked computed tomography scan image of the entire human body). If target image TI is another type of medical images (for example, a brain computed tomography scan image), the model training module will obtain the same type of marked medical images (for example, a marked brain computed tomography scan image). If target image TI is a traffic image, the model training module will obtain marked traffic images.

In this embodiment, target image TI is, for example, a computed tomography image. Therefore, the model training module obtains marked computed tomography images. The marked computed tomography images, for example, contain marked contents, as a professional medical team marks the liver, kidneys, gallbladder, pancreas, spleen and lesion on each computed tomography image, but the present disclosure is not limited thereto.

Then, in step S703, the model training module searches for the training segmentation parameters corresponding to the marked medical images according to the image segmentation algorithm.

The model training module has to do its level best to compute the training segmentation parameter corresponding to each marked medical image, such that the segmentation result obtained by executing an image segmentation algorithm on the marked medical images with the training segmentation parameters approximate to the marked contents of the marked medical images as much as possible.

In this embodiment, the image segmentation algorithm is, for example, OpenCV-based graphics segmentation algorithm, whereas the training segmentation parameter comprises Gaussian Blur parameter, threshold function parameter and the least component magnitude. The model training module computes the training segmentation parameter value corresponding to each marked medical image. In some embodiments, the model training module has to, for example, find a training segmentation parameter value corresponding to each marked medical image by brute force. In some embodiments, the model training module computes, for example, by selective search, a training segmentation parameter value corresponding to each marked medical image.

In some embodiments, the model training module computes, for example, by selective search, a preferred training segmentation parameter value corresponding to each marked medical image and then performs a certain degree (for example ±10%) of stepwise adjustment on the preferred training segmentation parameter. For example, after the model training module has found the preferred training segmentation parameter value corresponding to each marked medical image by selective search in order to further optimize parameter values, searching the best values within the ±10% range of the preferred training segmentation parameter value is performed. The Gaussian Blur parameter has searched to its optimal value of 0.05, for example, whereas the threshold function parameter has searched to its optimal value of 0.01, for example, and the least component magnitude has searched to its optimal value of 0.01, for example, but the present disclosure is not limited thereto.

Finally, in step S705, the model training module trains the machine learning model MLM according to the marked medical images and the optimal training segmentation parameters corresponding to the marked medical images.

The marked medical images and the optimal training segmentation parameters corresponding to the marked medical images can function as a training dataset for training a neural network shown in FIG. 3. For example, each marked medical image can function as an input layer, whereas the corresponding training segmentation parameter is used to compute a loss function for training the machine learning model MLM. However, the present disclosure is not limited thereto.

In this embodiment, the training dataset for training the machine learning model MLM comprises 100 marked medical images, whereas the test dataset comprises 45 marked medical images, wherein the preparation method for the test dataset is similar to that for the training dataset, and thus is, for the sake of brevity, not described herein.

Therefore, after being inputted according to target image TI, the machine learning model MLM thus trained can output the image segmentation parameter value corresponding to target image TI. Therefore, the image segmentation parameter for use in executing the image segmentation algorithm on target image TI can be determined, so as to obtain accurate image segmentation result RST1.

An embodiment of the present disclosure provides a machine-readable storage medium adapted to store therein a program and exemplified by, for example, the storage element 120 shown in FIG. 1. The program is loaded to a computer and executed thereon to carry out the image segmentation method illustrated by the aforesaid embodiments.

In conclusion, embodiments of the present disclosure provide an image segmentation method, an electronic device using the method, and a storage medium using the method, so as to compute image segmentation parameters corresponding to different target images with a machine learning model. Each target image is segmented with an image segmentation algorithm to render different image segmentation parameters applicable, thereby enhancing the precision of image segmentation results. Furthermore, the embodiments of the present disclosure employ edge detection technology to correct object region edges in the image segmentation results and thus further enhance the precision. In addition, the image segmentation method, the electronic device using the method, and the storage medium using the method, as provided in the embodiments of the present disclosure, not only enable user interaction by allowing users to select and watch object regions of interest, but also enable the edges of the selected object regions to be corrected by edge detection technology, so as to enhance the precision and the computation speed.

While the present disclosure has been described by means of specific embodiments, numerous modifications and variations could be made thereto by those skilled in the art without departing from the scope and spirit of the present disclosure set forth in the claims.

What is claimed is:

1. An electronic device, comprising:
    a display unit for displaying images;
    a storage element for storing a plurality of modules; and
    a processor coupled to the display unit and the storage element and adapted to access and execute the plurality of modules stored in the storage element, the plurality of modules comprising:
        an image retrieval module for obtaining a target image;
        a parameter calculation module for obtaining an image segmentation parameter value corresponding to the target image by inputting the target image into a machine learning model;
        an image segmentation module for executing an image segmentation algorithm on the target image with the image segmentation parameter value to obtain an image segmentation result, wherein the image segmentation result is segmenting the target image into object regions; and
        an image display module for displaying the image segmentation result on the display unit;
    wherein the image segmentation parameter value is the value of at least an image segmentation parameter, and the at least an image segmentation parameter comprises at least one of an image smoothening parameter, a threshold function parameter and a least component magnitude.

2. The electronic device of claim 1, wherein the image segmentation parameter value varies from different target images.

3. The electronic device of claim 1, further comprising an input component for receiving a selection signal, the selection signal corresponding to at least one selected region in the object regions, wherein the plurality of modules further comprises:
    an edge detection module for executing an edge detection algorithm on the target image to obtain an outline data of the target image; and
    an edge correction module for correcting the at least one selected region according to the outline data,
    wherein the image display module displays the at least one selected region corrected on the display unit.

4. The electronic device of claim 3, wherein, to execute the edge detection algorithm on the target image, the edge detection module is further for the steps of:
    computing a brightness gradient data corresponding to the target image; and
    computing the outline data according to the brightness gradient data and a gradient threshold corresponding to the target image.

5. The electronic device of claim 4, wherein the edge detection module computes the brightness gradient data corresponding to the target image with Sobel operator.

6. The electronic device of claim 4, wherein the edge detection module determines the gradient threshold corresponding to the target image by Otsu's method.

7. The electronic device of claim 3, wherein the outline data comprises outline pixels of the target image, and when correcting the at least one selected region according to the outline data, the edge correction module is further for the steps of:
    computing a first regional center of a first selected region, wherein the at least one selected region comprises the first selected region, and the first selected region comprises an edge pixel;
    determining whether an available pixel exists within a predetermined range of the edge pixels in the direction of a line connecting the first regional center and the edge pixels, wherein the available pixel is one of the outline pixels; and
    replacing the edge pixels of the first selected region with the available pixel.

8. The electronic device of claim 1, wherein the target image is a medical image, and the plurality of modules further comprises a model training module for:
    obtaining marked medical images;
    searching for training segmentation parameter values corresponding to the marked medical images according to the image segmentation algorithm; and
    training the machine learning model according to a training dataset and the training segmentation parameter values.

9. An image segmentation method, comprising the steps of:
    obtaining a target image;
    inputting the target image into a machine learning model to obtain an image segmentation parameter value corresponding to the target image;
    executing an image segmentation algorithm on the target image with the image segmentation parameter value to obtain an image segmentation result, wherein the image segmentation result is segmenting the target image into object regions; and
    displaying the image segmentation result;
    wherein the image segmentation parameter value is the value of at least an image segmentation parameter, and the at least an image segmentation parameter comprises at least one of an image smoothening parameter, a threshold function parameter and a least component magnitude.

10. The image segmentation method of claim 9, wherein the image segmentation parameter value varies from different target images.

11. The image segmentation method of claim 9, further comprising the steps of:
    receiving a selection signal, wherein the selection signal corresponds to at least one selected region in the object regions;
    executing an edge detection algorithm on the target image to obtain an outline data of the target image;
    correcting the at least one selected region according to the outline data; and
    displaying the at least one selected region corrected.

12. The image segmentation method of claim 11, wherein the step of executing the edge detection algorithm on the target image comprises:
    computing a brightness gradient data corresponding to the target image; and computing the outline data according to the brightness gradient data and a gradient threshold corresponding to the target image.

13. The image segmentation method of claim 12, wherein the step of computing the brightness gradient data corresponding to the target image comprises computing the brightness gradient data corresponding to the target image with Sobel operator.

14. The image segmentation method of claim 12, wherein the step of executing the edge detection algorithm on the target image further comprises determining the gradient threshold corresponding to the target image by Otsu's method.

15. The image segmentation method of claim 11, wherein the outline data comprises outline pixels of the target image, and the step of correcting the at least one selected region according to the outline data comprises:
computing a first regional center of a first selected region, wherein the at least one selected region comprises the first selected region, and the first selected region comprises an edge pixel;
determining whether an available pixel exists within a predetermined range of the edge pixels in the direction of a line connecting the first regional center and the edge pixels, wherein the available pixel is one of the outline pixels; and
replacing the edge pixels of the first selected region with the available pixels.

16. The image segmentation method of claim 9, wherein the target image is a medical image, and the image segmentation method further comprises the steps of:
obtaining marked medical images;
searching for training segmentation parameter values corresponding to the marked medical images according to the image segmentation algorithm; and
training the machine learning model according to a training dataset and the training segmentation parameter values.

17. A non-transitory machine-readable storage medium for storing a program, the program being loaded to a computer and executed thereon to carry out an image segmentation method, the image segmentation method comprising the steps of:
obtaining a target image;
inputting the target image into a machine learning model to obtain an image segmentation parameter value corresponding to the target image;
executing an image segmentation algorithm on the target image with the image segmentation parameter value to obtain an image segmentation result, wherein the image segmentation result is segmenting the target image into object regions; and
displaying the image segmentation result;
wherein the image segmentation parameter value is the value of at least an image segmentation parameter, and the at least an image segmentation parameter comprises at least one of an image smoothening parameter, a threshold function parameter and a least component magnitude.

18. The non-transitory machine-readable storage medium of claim 17, wherein the image segmentation parameter value varies from different target images.

19. The non-transitory machine-readable storage medium of claim 17, wherein the image segmentation method further comprises the steps of:
receiving a selection signal corresponding to at least one selected region in the object regions;
executing an edge detection algorithm on the target image to obtain an outline data of the target image; and
correcting the at least one selected region according to the outline data; and
displaying the at least one selected region corrected.

20. The non-transitory machine-readable storage medium of claim 19, wherein the step of executing the edge detection algorithm on the target image comprises:
computing a brightness gradient data corresponding to the target image; and
computing the outline data according to the brightness gradient data and a gradient threshold corresponding to the target image.

21. The non-transitory machine-readable storage medium of claim 20, wherein the step of computing the brightness gradient data corresponding to the target image comprises computing the brightness gradient data corresponding to the target image with Sobel operator.

22. The non-transitory machine-readable storage medium of claim 20, wherein the step of executing the edge detection algorithm on the target image further comprises determining the gradient threshold corresponding to the target image by Otsu's method.

23. The non-transitory machine-readable storage medium of claim 19, wherein the outline data comprises outline pixels of the target image, and the step of correcting the at least one selected region according to the outline data comprises:
computing a first regional center of a first selected region, wherein the at least one selected region comprises the first selected region, and the first selected region comprises an edge pixel;
determining whether an available pixel exists within a predetermined range of the edge pixels in the direction of a line connecting the first regional center and the edge pixels, wherein the available pixel is one of the outline pixels; and
replacing the edge pixels of the first selected region with the available pixel.

24. The non-transitory machine-readable storage medium of claim 17, wherein the target image is a medical image, and the image segmentation method further comprises the steps of:
obtaining marked medical images;
searching for training segmentation parameter values corresponding to the marked medical images according to the image segmentation algorithm; and
training the machine learning model according to a training dataset and the training segmentation parameter values.

* * * * *